United States Patent [19]

London et al.

[11] E Re. 31,075

[45] Reissued Nov. 9, 1982

[54] GARMENT BAG ASSEMBLY

[75] Inventors: Wallace London, 641 S. Monroe St., Baltimore, Md. 21223; Kurt L. Meyer, Ellicot City, Md.

[73] Assignee: Wallace London, Baltimore, Md.

[21] Appl. No.: 253,385

[22] Filed: Apr. 13, 1981

Related U.S. Patent Documents

Reissue of:

[64] Patent No.: 4,252,220
Issued: Feb. 24, 1981
Appl. No.: 98,869
Filed: Nov. 30, 1979

[51] Int. Cl.[3] ..... A45C 3/00

[52] U.S. Cl. ..... 190/41 B; 24/248 B; 206/285; 206/287

[58] Field of Search ..... 190/41 B; 206/279, 285, 206/287; 24/248 B

[56] References Cited

U.S. PATENT DOCUMENTS 3,542,170 11/1970 Bialo ..... 190/41 B
3,566,456 3/1971 London ..... 206/285 X

*Primary Examiner*—Donald F. Norton
*Attorney, Agent, or Firm*—Samuel Lebowitz

[57] ABSTRACT

A framed garment bag with flexible walls having exterior suspension means at the top thereof and a jointed clamp disposed in a substantially vertical plane on the interior thereof. The upper jaw of the clamp which is fixed to the underside of the top and the lower jaw which is pivoted to the rear end of the former are fitted with contiguous edges of yieldable material which effect a tight retention of the hooks of the garment hangers disposed therebetween when the jaws are clamped together in a plane parallel to the top of the frame of the bag. When the jointed clamp is open for loading or unloading the garment hangers, the controlled limited downward inclination of the lower jaw provides a convenient frictional guide for the hangers preparatory to their lifting into juxtaposition to the fixed upper jaw by the movement of a clasp of high mechanical efficiency, which movement terminates in a secure clamping between the jaws. The tight clamping of the garment hanger hooks between the contiguous edges of the yieldable material eliminates all possibilities of disengagement of the latter from the clamp under all conditions of rough handling of the garment bag in transit.

17 Claims, 8 Drawing Figures

Fig. 1
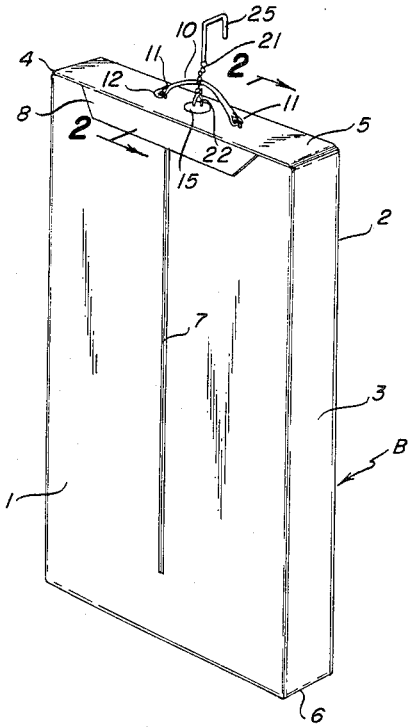
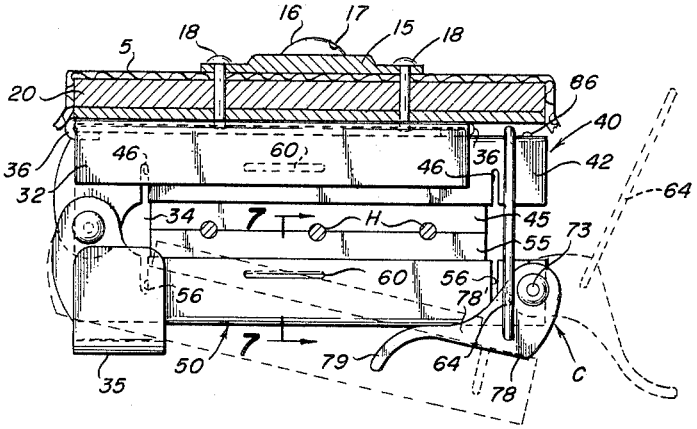
Fig. 2

Fig. 3
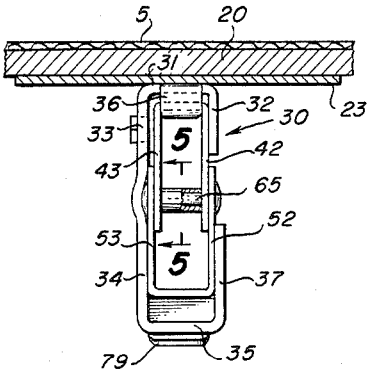
Fig. 4
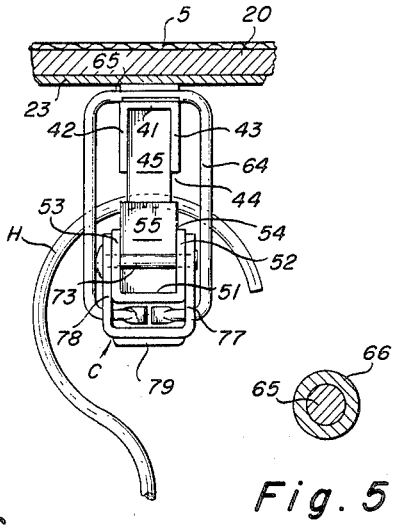
Fig. 5
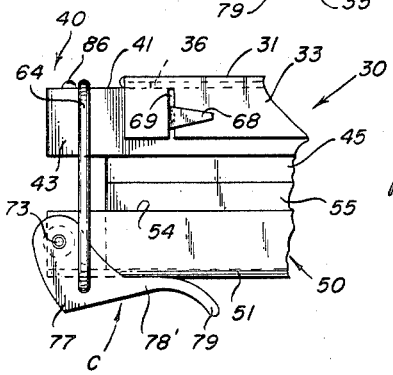
Fig. 6
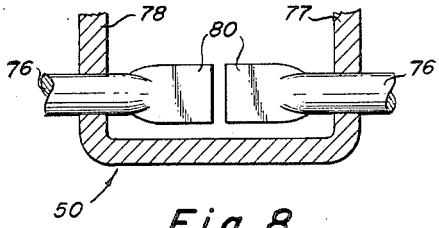
Fig. 8
Fig. 7
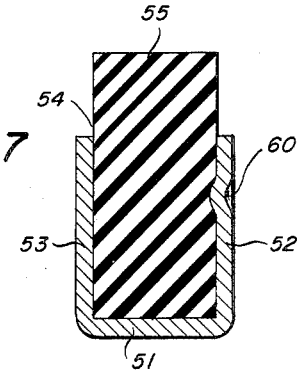

GARMENT BAG ASSEMBLY

Matter enclosed in heavy brackets [ ] appears in the original patent but forms no part of this reissue specification; matter printed in italics indicates the additions made by reissue.

This invention relates to a garment bag assembly and particularly one capable of accommodating one or several garment hangers supporting different items of clothing which are adapted to be housed in their entirety within the garment bag.

It is the object of the present invention to provide an improved garment bag assembly which incorporates therein an improved garment hanger clamp of the type covered by U.S. Pat. No. 3,566,456, issued to one of the coinventors herein, namely, Wallace London, on Mar. 2, 1971. The special mounting of the jointed clamp in the garment bag makes possible the convenient and rapid loading and unloading of the garments into and from the garment bag and the suspension of the garments on hangers with no protrusion of any parts of the latter from the garment bag, as was the case in the earlier patented construction.

It is a further object of the invention to provide a secure clamp for the hooks of the wire hangers so that they cannot be dislodged therefrom, no matter how roughly the garment bag may be handled in transport.

It is another object of the invention to provide a rugged and reliable assembly which may be incorporated within garment bags in the course of their manufacture, or which may be applied to finished garment bags.

Other objects and purposes will appear from the detailed description of the invention following hereinafter, taken in conjunction with the accompanying drawings, wherein:

FIG. 1 is a perspective external view of the improved garment bag in accordance with the invention;

FIG. 2 is a vertical sectional view along line 2—2 of FIG. 1;

FIG. 3 is a left end view of FIG. 2;

FIG. 4 is a right end view of FIG. 2;

FIG. 5 is a vertical sectional view along line 5—5 of FIG. 3;

FIG. 6 is a rear view of the right portion of FIG. 2;

FIG. 7 is a vertical sectional view along line 7—7 of FIG. 2; and

FIG. 8 is an enlarged view of the lower portion of FIG. 4 with certain parts in section.

FIG. 1 of the drawings shows a garment bag B formed of flexible walls provided with means on the top thereof for suspending the bag while loading and unloading the same with garments of long or short lengths, which are designed to be housed therein, and which are adapted to be carried either in an extended condition as shown in FIG. 1, or which may be folded for more convenient transport.

Such bags have come into extensive use in recent years and may be provided with slide fastener closures, multiple pockets for storage of items complementary to the garments housed in the bag, latching and strapping devices, handles at one or both ends of the bags, etc., none of which features are germane to the instant invention. Such garment bags are fully disclosed in the following patents and are illustrative of a voluminous amount of art in this highly developed field:

U.S. Pat. No. 2,606,636 Aug. 12, 1952
U.S. Pat. No. 2,671,706 Mar. 9, 1954
U.S. Pat. No. 2,689,631 Sept. 21, 1954
U.S. Pat. No. 2,862,586 Dec. 2, 1958
U.S. Pat. No. 3,221,848 Dec. 7, 1965
U.S. Pat. No. 3,958,675 May 25, 1976

The garment bags shown in the above-noted patents disclose different confining arrangements for the hooks of the garment hangers of varying designs and complexity, none of which has proven totally capable of preventing at least some of the hangers from working loose from their confinement and ultimately dropping into the bag with the consequent wrinkling and crushing of the clothing. The instant invention eliminates this problem with certainty.

As shown in FIG. 1, the garment bag in accordance with the present invention may be fabricated from any suitable waterproof and wear-resistant material of fabric, leather or plastic sheeting, or combinations thereof. The bag is comprised of a flexible front wall 1, rear wall 2, lateral walls 3 and 4, and top and bottom walls 5 and 6, respectively. The bag may be shaped by an inner frame member 20 which extends across the top 5 and, if desired, partially along the upper portions of the lateral walls 3 and 4. The frame 20 may be formed of any rigid material such as plywood, metal, plastic or combinations thereof, and the flexible covering of the top wall and upper portions of the sides may be integrated to the frame 20 by gluing, riveting, or other modes of joining.

A slide fastener 7 may be provided at the center of the front wall which extends to the top to subdivide the front wall into two parts to permit ready access to the interior of the bag. The opening at the top of the front wall may be covered by a flexible flap 8, extending from the front edge at the top 5.

As an alternative to the single central slide fastener 7 shown in FIG. 1, multiple slide fasteners or a slide fastener extending in multiple directions, may be provided as shown in the patents enumerated above.

In FIG. 1 is shown a handle 10 for transporting the bag, the ends of which may be looped at 11 and confined within retainers which are riveted to the frame member 20 and to wall 5, as well as to any interior lining 23 below the frame member. The integration of these components is also supplemented by the mounting of a central escutcheon plate 15 which is fastened to the center of the top wall 5 by means of rivets 18 which likewise extend through the outer fabric on top wall 5, frame member 20 and the internal lining 23 on the latter. The rivets 18 also extend through the top wall of the bracket 30 which supports the upper fixed jaw of the jointed clamp, as described fully hereinafter.

The plate 15 seats a movable spherically-shaped member 16 provided with recesses 17 in which may be inserted a detachable handle member for suspending the garment bag from a wall hook, closet door, or the like, in the course of loading or unloading the garment bag. The hook 25 is connected to one end of a chain 21, the other end of which is fitted with a spring hook 22 adapted to detachably engage the openings 17 of the member 16. This hook support is readily detachable from the bag for transport, all as well known in the art, and as disclosed in the above-mentioned patents.

The bracket support 30 for the improved clothes hanger clamp is affixed to the inner surface of the frame member 20 centrally of the garment bag. As stated above, this may be done by riveting, such as by rivets 18. The top wall 31 of the bracket support 30 is provided with lateral flanges 32 and 33, which are adapted to embrace the upper channel 40 of the jointed clamps and may be connected therewith in different ways at several points. Thus, tabs 36 may extend from the opposite ends of top wall 31 and are bent inwardly into contact with the end wall of the upper channel 40. The tab at the rear end of the wall engages the undersurface of the channel to act as a retainer therefor while the tab 36 at the front rests on the channel and provides a spacer for the heads of the rivets 18, as shown in FIG. 2.

The jointed clamp disclosed in earlier U.S. Pat. No. 3,566,456 has been improved in many respects to render it capable of withstanding the heavier loads imposed upon it by virtue of its support by the bracket 30 within the garment bag in a substantially vertical plane. The jointed clamp serves not only as a clamp for the hook portions of the garment hanger, but also serves to support the garments, whereas in the patented arrangement the latter were supported externally on a rod, hook, or the like.

The jointed clamp shown in the drawings is comprised of upper and lower channels 40 and 50, respectively, which are pivotally joined at one end by means of rivet 65, which extends beyond the external wall of the channels. A sleeve 66 surrounds the rivets between the internal walls of the channels to reenforce the pivotal joint.

The upper channel 40 is fixed in substantially horizontal position by the surrounding bracket 30, and is clamped thereto by tab 36 engaging the rear end of the channel. This retention may be supplemented by one or more prongs 68 stamped from the outer lateral wall of channel 40 for passage through one or more slots 69 in lateral wall 33 of bracket 30 and bent into contact with the latter, as shown in FIG. 6.

The lateral flange 33 of the bracket support 30 extends along the lateral wall of the upper clamp and is provided with downwardly extending member 34 which is bent transversely at its lower end to form a stop 35 below the bottom of the lower channel. The stop 35 may be continued and bent upwardly into a flange 37, which together with elements 34 and 35, forms a J-shaped guide for the lower channel 50 as it moves from its horizontal clamping position as shown in full lines in FIG. 2 to its open position, as shown in dotted lines, at an inclination of approximately 15° which serves as a convenient guide for the successive garment hangers as they are presented into or withdrawn from the garment bag. The downwardly projecting stop member 34-35-37 is preferably extended from the rear portion of flange 33, but this positioning may be modified so long as the stop 35 does not interfere with the clasp assembly C at the forward part of the jointed clamp.

As shown in FIGS. 2 to 8, the basic elements of the improved clamp in accordance with the instant invention are similar to those disclosed in U.S. Pat. No. 3,566,456, but which have been improved in the several respects described below.

As stated above, the jointed clamp is composed of an upper fixed channel 40 and a movable lower channel 50 pivotally connected to each other at the rear ends thereof by the hinge pin 65 which is reenforced by the surrounding sleeve 66. The upper channel 40 is provided with an end wall 41 and lateral walls 42 and 43 extending therefrom which form an open face 44 opposite end wall 41. The complemental lower channel 50 is disposed congruously to the upper channel 40 and consists of the end wall 51 and opposed lateral walls 52 and 53 to present an open face at 54. The blocks 45 and 55, of resilient or yieldable material such as rubber, are seated in each of the respective channels for most of their length, and portions thereof protrude beyond the open faces of the channels. The walls 42 and 52 of the channels are provided with transverse slots 46 and 56, respectively, adjacent the ends of the blocks to facilitate the turning of the terminal edges of the lateral walls to bite into the surfaces of blocks 45 and 55 along the open faces, without distorting the alignment between the components of the clamp.

Also, the edges of the lateral walls at the transverse slots 56 and 46 may be turned down to retain securely the blocks 45 and 55 within the respective channels. The retention of the resilient blocks within the channels is reenforced by indentations or dimples 60 in one or both lateral walls of each channel which become embedded in the lateral surfaces of the resilient blocks.

The clasp C may be constituted by lateral wings 77 and 78 embracing the free end of channel 50. The wings are pivotally mounted on the channel by means of a pintle 73 to permit the rotation of the clasp by means of the handle 78 interconnecting the wings wherefrom extends the finger piece 79.

A wire retaining hook 64, closed at one end 65 and provided with lateral arms 76 at the opposite end, is seated within aligned openings in the wings 77 and 78 at the bail of the clasp C. Upon swinging the loop 64 into engagement with a retaining protuberance 86 adjacent the forward edge of the end wall of channel 40, the clasp may be closed and tightened with great force by virtue of the eccentric mounting of the clasp on pintle 73 and the high mechanical efficiency attained therefrom. The open position of the clasp is shown in dotted lines in FIG. 2, which upon rotation in a clockwise direction, serves to tightly clamp together the channels 50 and 40, to compress and retain the wire hook portions H of any hangers which may be interposed between the protruding portions of the resilient blocks 55 and 45.

The stresses imposed upon the wire loop 64 when it embraces a large number of garment hangers, cause spreading of the arms 76 and the occasional withdrawal of the transverse ends thereof from the openings in the wings of the bail. This tendency is prevented by flattening the free ends 80 of the arms following their insertion into the aligned openings of the bail.

The reenforcement of the jointed clamp at the pivotal joint of the channels, at the retaining hook of the locking clasp, and at the retention means for the yieldable blocks which compress the garment hangers together, produces a clamp assembly which withstands effectively the heavy loads imposed thereon in the adaptation thereof in a garment bag assembly as disclosed herein.

We claim:

1. In a frame type garment bag assembly having means on the outside of the top thereof for suspending the bag while loading therein or unloading therefrom a plurality of garments on supports therefor, each comprising a vertical wire shank extending upwardly from the center of the support and terminating in a downwardly extending curved hook portion, and means for securely locking a plurality of the garment supports entirely within the bag, the improvement comprising (a) a jointed clamp disposed in a generally vertical plane and formed of upper and lower congruous channels pivotally mounted to each other at the rear ends thereof, with the open edge of each channel facing the other, (b) a horizontally disposed hinge pin at said rear ends extending beyond the external surfaces of said channels, (c) a reenforcing sleeve surrounding said hinge pin between the internal surfaces of said channels, (d) a strip of resilient material seated within each channel and protruding beyond the open edge thereof, (e) a latching device of high mechanical efficiency at the front end of said jointed clamp for alternately permitting the spreading of said channels or the clamping thereof together, for embracing the hook portions of the garment supports to maintain them in fixed position, (f) a bracket support for said clamp having an upper member affixed to the inside of the top of the garment bag with means for attaching thereto said upper channel in fixed substantially horizontal position, and (g) a lower member in said bracket support extending downwardly from said upper member to provide a limit stop for the pivotal movement of the lower channel in the open position of said jointed clamp, to provide an inclined support for the hook portions of the garment supports in the course of loading and unloading the latter into and from the garment bag.

2. A device as set forth in claim 1, wherein said last-mentioned lower member of said bracket support is an integral extension of said upper member and is comprised of a vertical plate adjacent the external surfaces of one side of said channels and a lateral stop extending transversely from the lower end of said plate below the rear end of the lower channel and slightly displaced therefrom.

3. A device as set forth in claim 1, wherein said last-mentioned lower member of said bracket support is an integral extension of said upper member and is of J-shaped cross-section, with the lower end thereof spaced slightly from the lower channel to limit the permissible pivotal movement of the latter to approximately 15°.

4. A device as set forth in claim 1, wherein said latching device comprises a bail having one end thereof rotatably mounted on said lower channel at the free end thereof remote from its pivotal connection to the upper channel and a manipulative finger-hold on the opposite end of said bail, stop means adjacent to the top of the free end of said upper channel, and a continuous loop of wire having the opposite aligned free ends thereof pivotally mounted within eccentrically disposed aligned openings at an intermediate portion of said bail with the terminal portion of said ends being flattened to prevent the withdrawal of said ends from said aligned openings, and the opposite closed end of said loop adapted for selective engagement with said stop means.

5. A device as set forth in claim 1, wherein at least one lateral wall of each channel is provided with transverse slots adjacent to the opposite ends of the channel and extending to the open edge thereof to facilitate the distortion of said edge into tighter engagement with the strip of resilient material embraced thereby, and an additional indentation in said lateral wall for impaling said strip and reenforcing the retention of said resilient material within the respective channel.

6. A clamp for the upper wire portion of a garment support, comprising (a) a pair of congruous sheet metal channels pivotally mounted to each other at one end thereof with the open edge of each channel facing the other, (b) a hinge pin extending through the walls of said channels at said one end, (c) a sleeve surrounding said hinge pin to reenforce the pivotal joint of said channels, (d) a strip of resilient material seated within each channel and protruding beyond the open edge thereof, (e) an indentation in a lateral wall of each channel for impaling and securely anchoring said strip therein, and (f) a latching device of high mechanical efficiency on the opposite free ends of said channels for alternately permitting the spreading of said channels or the clamping thereof together, for embracing the wire portions of the spaced garment supports and to maintain them in fixed position, said latching device comprising a bail having one end thereof rotatably mounted on one of said channels at the free end thereof remote from its pivotal connection to the second channel and a manipulative finger-hold on the opposite end of said bail, stop means adjacent to the free end of the end wall of said second channel, and a continuous loop of wire having the opposite aligned free ends thereof pivotally mounted within eccentrically disposed aligned openings at an intermediate portion of said bail with the terminal portion of said ends being flattened to prevent the withdrawal of said ends from said aligned openings and the opposite closed end of said loop adapted for selective engagement with said stop means.

*7. A clamp for the upper wire portion of a garment support, comprising*

*(a) a pair of substantially congruous sheet metal channels pivotally mounted to each other at one end thereof with the open edge of each channel facing the other,*

*(b) a hinge pin extending through the walls of said channels at said one end,*

*(c) a sleeve surrounding said hinge pin to reenforce the pivotal joint of said channels,*

*(d) a strip of resilient material seated within each channel and protruding beyond the open edge thereof, and*

*(e) a latching device of high mechanical efficiency on the opposite free ends of said channels for alternately permitting the spreading of said channels or the clamping thereof together, for embracing the wire portions of the spaced garment supports and to maintain them in fixed position, said latching device comprising a bail having one end thereof rotatably mounted on one of said channels at the free end thereof remote from its pivotal connection to the second channel and a manipulative finger-hold on the opposite end of said bail, stop means adjacent to the free end of the end wall of said second channel, and a continuous loop of wire having the opposite aligned free ends thereof pivotally mounted within eccentrically disposed aligned openings at an intermediate portion of said bail with the terminal portion of said ends being flattened to prevent the withdrawal of said ends from said aligned openings and the opposite*

*closed end of said loop adapted for selective engagement with said stop means.*

*8. A device as set forth in claim 7, including an indentation in a lateral wall of each channel for impaling and securely anchoring said strip therein.*

*9. In a frame type garment bag assembly having means on the outside of the top thereof for suspending the bag while loading therein or unloading therefrom a plurality of garments on supports therefor, each comprising a vertical wire shank extending upwardly from the center of the support and terminating in a downwardly extending curved hook portion, and means for securely locking a plurality of the garment supports entirely within the bag, the improvement comprising*

*(a) a jointed clamp disposed in a generally vertical plane and having an upper channel fixed to the top of the garment bag and a lower channel pivotally mounted to said upper channel at one end thereof, with the open edge of each channel facing the other,*

*(b) a horizontally disposed hinge pin at said end extending beyond the external surfaces of said channels,*

*(c) a reenforcing sleeve surrounding said hinge pin between the internal surfaces of said channels,*

*(d) a strip of resilient material seated within each channel and protruding beyond the open edge thereof,*

*(e) a latching device of high mechanical efficiency at the opposite end of said jointed clamp for alternately permitting the spreading of said channels or the clamping thereof together, for embracing the hook portions of the garment supports to maintain them in fixed position, and*

*(f) means extending between said last-mentioned upper channel and said lower channel for limiting the pivotal movement of the latter in the open position of said jointed clamp, to provide an inclined support for the hook portions of the garment supports in the course of loading and unloading the latter into and from the garment bag.*

*10. A device as set forth in claim 9, wherein said last-mentioned means comprises a member extending from said upper channel at said first-mentioned end and underlying the lower channel at a slight displacement therefrom adjacent to said hinge pin, the underlying portion of said member thereby providing a stop for the downward movement of said lower channel in the open position of said jointed clamp to a limited extent.*

*11. A device as set forth in claim 10, wherein said member embraces said channels at said first-mentioned end for at least the major periphery thereof.*

*12. A device as set forth in claim 11, wherein the top of said member is affixed to the exterior of the top wall of said upper channel above said hinge pin.*

*13. A device as set forth in claim 12, wherein the top of said member and the stop of the underlying portion thereof are integral and are bridged by a vertical plate adjacent to the external surfaces of said channels at least on one of the sides thereof.*

*14. A device as set forth in claim 10, wherein the displacement of the stop from the hinge pin limits the pivotal movement of the lower channel to approximately 15° from the horizontal.*

*15. A device as set forth in claim 9, wherein said latching device comprises a bail having one end thereof rotatably mounted on said lower channel at the free end thereof remote from its pivotal connection to the upper channel and a manipulative finger-hold on the opposite end of said bail, stop means adjacent to the top of the free end of said upper channel, and a continuous loop of wire having the opposite aligned free ends thereof pivotally mounted with eccentrically disposed aligned openings at an intermediate portion of said bail with the terminal portion of said ends being flattened to prevent the withdrawal of said ends from said aligned openings, and the opposite closed end of said loop adapted for selective engagement with said stop means.*

*16. A device as set forth in claim 15, wherein at least one lateral wall of each channel is provided with transverse slots adjacent to the opposite ends of the channel and extending to the open edge thereof to facilitate the distortion of said edge into tighter engagement with the strip of resilient material embraced thereby.*

*17. A device as set forth in claim 16, including an indentation in a lateral wall of each channel for impaling said strip and reenforcing the retention of said resilient material within the respective channel.*

* * * * *